H. C. LYONS.
DISPENSING MEANS FOR BEVERAGES CONTAINING CHOCOLATE, COCOA, &c.
APPLICATION FILED FEB. 17, 1920.
1,367,823.
Patented Feb. 8, 1921.
2 SHEETS—SHEET 1.
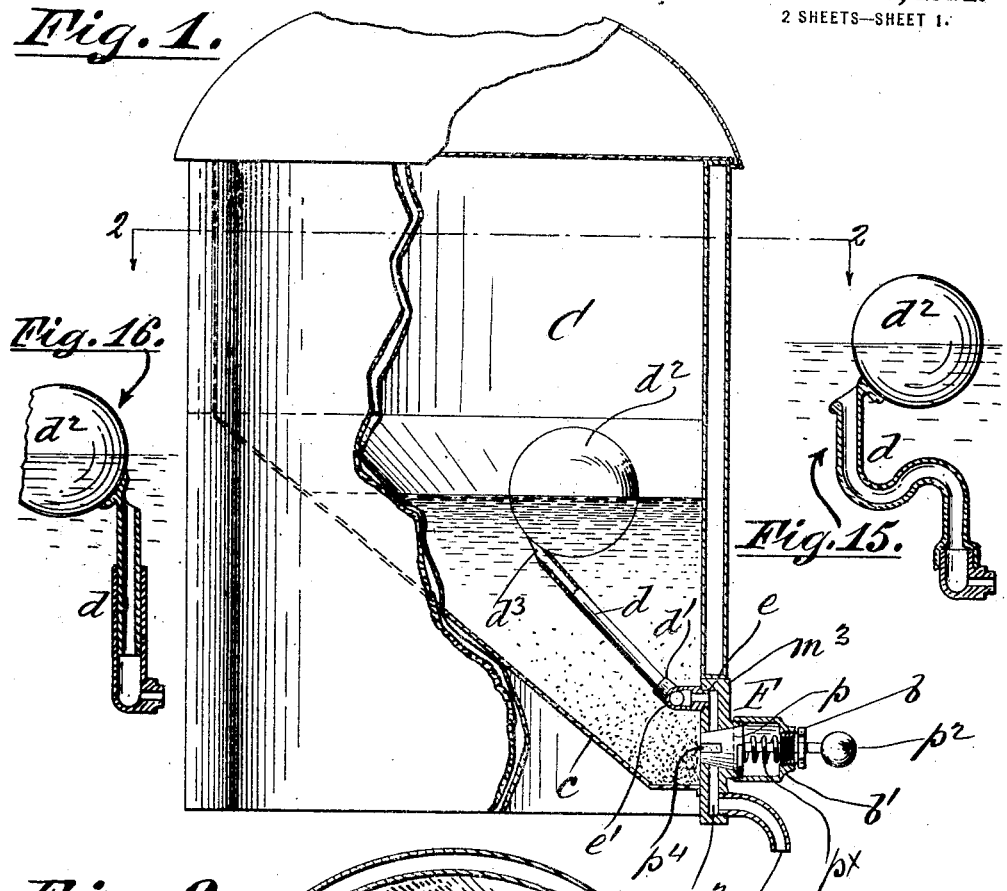
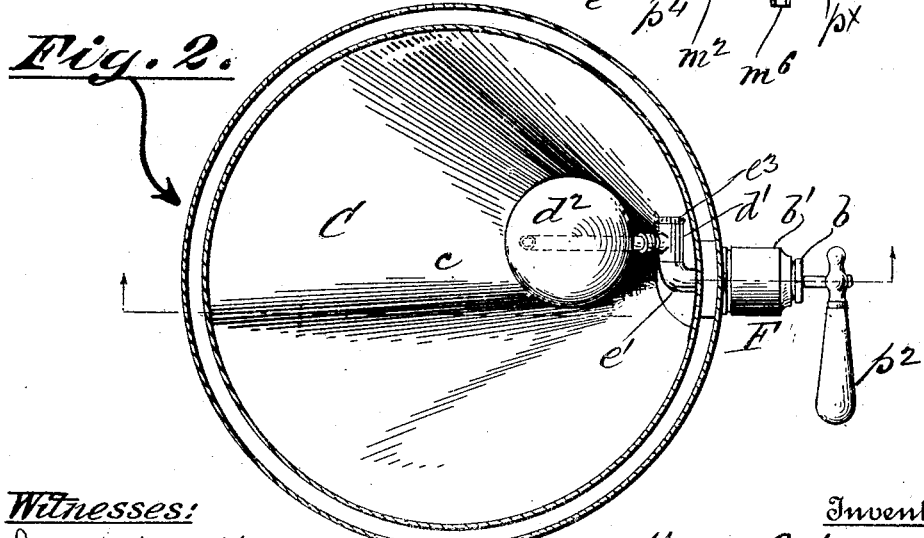

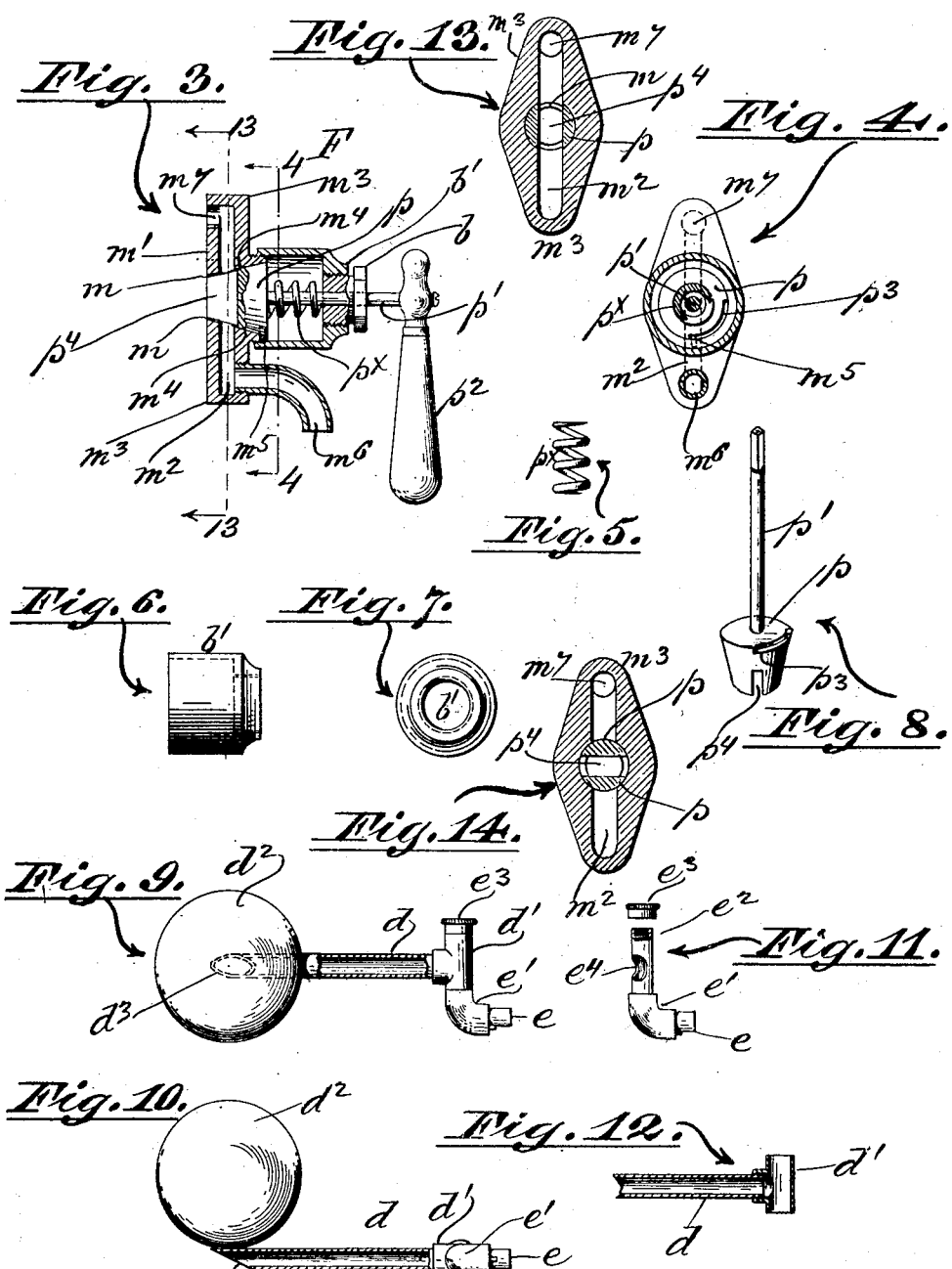

UNITED STATES PATENT OFFICE.

HARRY C. LYONS, OF NEW YORK, N. Y.

DISPENSING MEANS FOR BEVERAGES CONTAINING CHOCOLATE, COCOA, &c.

1,367,823.  Specification of Letters Patent.  Patented Feb. 8, 1921.

Application filed February 17, 1920. Serial No. 359,358.

*To all whom it may concern:*

Be it known that I, HARRY C. LYONS, a citizen of the United States, and a resident of the borough of Manhattan, city, county, and State of New York, have invented certain new and useful Dispensing Means for Beverages Containing Chocolate, Cocoa, &c., of which the following is a specification.

In the preparation of beverages containing chocolate, cocoa and the like the extract of cacao is diluted more or less with hot milk and water, and is only partially dissolved thereby, the admixture being a solution in which the heavier constituents settle to the bottom thereof and constitute a sediment of viscid, semi-fluid character, while the upper part of the concoction is relatively thin and fluent.

Hence, in dispensing beverages of this character it has heretofore been necessary to stir and agitate the admixture preparatory to pouring, or to prepare the same in small quantities as required for immediate use,—disadvantages which it is the primary object of my invention to obviate. To this end my invention consists essentially in simultaneously drawing the heavier constituents from the lower part of an admixture and the lighter and more fluid component parts thereof from above in such manner that the latter flush and act as a vehicle for the discharge of the said heavier and sluggish constituents, all as hereinafter more fully set forth.

In the accompanying drawings,

Figure 1, is a partial central vertical sectional elevation of a dispensing urn or container embodying the essential features of my invention;

Fig. 2, is a horizontal section thereof, taken upon plane of line 2—2, Fig. 1;

Fig. 3, is a central vertical sectional elevation, on a larger scale, of the dispensing faucet;

Fig. 4, is a transverse section thereof, taken upon plane of line 4—4, Fig. 3;

Fig. 5, is a view of the valve plug-seating spring;

Fig. 6, is a side elevation of the faucet cap;

Fig. 7, is a front view thereof;

Fig. 8, is a perspective view of the valve plug;

Fig. 9, is a top view, partly in section, of the floatable drain duct and coupling;

Fig. 10, is a side elevation thereof, also partly in section;

Fig. 11, is a detail in elevation of the floatable drain duct fulcrum elbow;

Fig. 12, is a sectional detail of the lower end of the said drain duct;

Fig. 13, is a vertical section taken upon plane of line 13—13, Fig. 3;

Fig. 14, is a like section, but showing the valve plug turned into the position shown in Fig. 1;

Fig. 15 is a view illustrating a modification in the construction of the floatable drain duct in which a flexible tube is interposed between the float and the mixing and discharge chamber; Fig. 16 is a view illustrating a modification in which a telescopic floatable drain duct is used.

C, represents an urn or container of any desired or suitable construction for the reception and storage temporarily of the cacao beverage to be dispensed through the faucet F. The floor $c$, of the reservoir is convergently inclined toward said dispensing faucet F, as shown particularly in Fig. 1, for the purpose of concentrating the sedimentary constituents of the concoction in suitable juxtaposition to the outlet therefor. Said sediment outlet consists of an aperture $m$, formed for the purpose in the inner side wall $m'$, of the mixing and discharge chamber $m^2$, said mixing and discharge chamber $m^2$, being formed in the casing $m^3$, in which the valve plug $p$, is seated, as shown in Figs. 1 and 3 particularly. The valve plug $p$, is preferably of conoidal form, as is also its main seat $m^4$, in the casing $m^3$, so that a tight fluid-proof seal may be attained,—the said plug $p$, being held to its seat by elastic resilient means, as by a spring $p^x$, interposed between it and the bushing $b$, through which the stem $p'$, of the valve plug $p$, extends,— said bushing $b$, being screwed into the outer end of the cap $b'$, which in turn is screw-connected with the valve casing $m^3$. The protrusion of the valve stem $p'$, beyond the bushing $b$, is provided with a handle $p^2$, by means of which the valve plug $p$, may be partially rotated on its axis, the extent of rotation being limited to one fourth of a circle by suitable means, as by a pin $m^5$, on the casing $m^3$, which protrudes into a peripheral groove $p^3$, extending around one fourth of the circumference of said plug $p$;

as shown more particularly in Figs. 4 and 8. The object of thus limiting the rotation of the plug $p$, to one quarter of a turn in either direction is to control the position of the sediment receiving pocket $p^4$, with relation to the mixing and discharge chamber $m^2$. Said sediment receiving pocket $p^4$, extends through the inner end or face of the valve plug $p$, as shown in Figs. 1, 3 and 8, and hence through the inner wall $m'$, and aperture $m$, of the casing $m^3$, so as to communicate directly with the lower portion of the container C, as shown more particularly in Fig. 1, and hence is constantly open for the reception of the semi-fluid sedimentary deposit of the more solid portions of the cacao concoction. It is to be noted in this connection that the sediment pocket $p^4$, extends transversely and diametrically across the inner end of the valve plug $p$. As a result, when the said valve plug $p$, is turned into the position shown in Fig. 1, the said sediment receiving pocket $p^4$, is positioned transversely across the mixing chamber $m^2$, (the latter being in the form of an elongated vertical passage as shown in Figs. 13 and 14, and as indicated by dotted lines in Fig. 4) and cut off therefrom, but free to receive the slow flowing sediment so that when the valve plug $p$, is thus at rest, between the dispensing of the beverage, the pocket $p^4$, becomes charged with the sediment, as in Fig. 1. When the valve plug $p$, is given a quarter turn from this position, the sediment receiving pocket $p^4$, is brought into alinement and communication with the mixing and discharge chamber $m^2$, as shown in Figs. 3 and 13, so as to be capable of discharging its contents thereinto, and at the same time connecting said mixing and discharge chamber $m^2$, indirectly with the lower part of the container C.

The lower part of the mixing and discharge chamber $m^2$, communicates with a discharge spout $m^6$, and its upper part with an inlet socket $m^7$, formed for the reception and support of discharge end $e$, of the fulcrum elbow $e'$, the lateral extension $e^2$, of which constitutes the trunnion upon which the lower end of the floatable drain duct $d$, is pivotally supported. That is to say, the lower end of the floatable drain duct $d$, is formed with a cross sleeve or T $d'$, which fits over said lateral extension $e^2$, of the fulcrum elbow $e$, and is held thereon by a screw cap $e^3$, engaging with the threaded end of said lateral extension $e^2$, of the fulcrum elbow $e$. The lateral extension or trunnion $e^2$, is formed with a port $e^4$, (Fig. 11) of shape and area sufficient to maintain continuous communication between the lower end of the floatable drain duct $d$, and the inlet passage through the elbow $e'$, and discharge end $e$, thereof, and hence continuous communication with the mixing and discharge chamber $m^2$. The discharge end $e$, of the fulcrum elbow $e'$, fits snugly within the socket $m^6$, in the upper part of the mixing chamber casing $m^3$, so as to be readily detachable therefrom by simply pulling the float drain pipe $d$, inward toward the center of the container,—thus freeing it and said fulcrum elbow from engagement with the casing $m^3$. Furthermore, by the removal of the cap screw $e^3$, the fulcrum extension $e^2$, and elbow $e'$, may be readily detached from the cross T $d'$, of the floatable drain duct $d$, so that all the parts and joints are rendered readily accessible and cleanable,— an important advantage for sanitary and other practical reasons. In this connection also, it may be noted that the valve plug $p$, and appurtenances thereto, may for like reasons be quickly and conveniently removed from the casing $m^3$, by simply unscrewing the cap $b'$, and as quickly replaced when desired, thus affording ready access not only to these parts, but also to the mixing chamber $m^2$.

A float $d^2$, of any desired construction is attached to the floatable duct $d$, at or near its upper extremity, in such manner as to maintain the mouth or inlet $d^3$, of the said duct $d$, a sufficient distance below the level of the liquid in the reservoir C, to avoid contact with the "skin" or "scum" that collects and floats on the top thereof. Hence, obviously, the fluent upper strata of the liquid in the receptacle C, above the sedimentary deposit and below the surface "scum," will always have access to the inlet $d^3$, of said floatable drain duct $d$, no matter what the height of the liquid level may be, nor how much said level may vary, vertically considered, as related to the mixing and discharge chamber $m^2$.

Hence, whenever the valve plug $p$, is turned into the position shown in Fig. 3, with its sediment receiving pocket $p^4$, in vertical alinement with the vertical mixing chamber $m^2$, it is obvious that a flow of the lighter liquid constituents through the floatable duct $d$, and said mixing chamber to the discharge spout $m^6$, will act as a vehicle for the removal of the sedimentary constituents present in the pocket $p^4$, and will also tend to induct fresh sediment thereinto, to be flushed out of the spout $m^6$, with such more fluent constituents from above.

It will thus be seen that the valve plug $p$, performs a double function in that it not only acts as a faucet, but also as a receptacle for the more sluggish constituents of the admixture while it is at rest in the interim between successive acts of dispensing of the beverage through the spout $m^6$, thereby segregating an initial charge of the sediment and then, when the plug is reversed in position, presenting the same directly in the path of the more fluent liquid as the latter descends through the mixing chamber to the spout $m^6$. In fact, the pocket $p^4$, becomes an essential part of the mixing chamber $m^2$, when the plug is turned into dispensing position.

Thus by my improved apparatus for dispensing cacao beverages I obviate the need of agitation thereof by stirring or equivalent means, and at the same time insure an equable proportion of all the constituents of the concoction as drawn off for immediate use. Another practical advantage is that this result is attained without opening up the container, thus excluding atmospheric dust, germs, etc., especially deleterious in a beverage of the character designated.

It will be readily seen by reference to Figs. 15 and 16, that the duct $d$, may be modified in form and still perform the same function without departing from the spirit and intent of my invention. Thus in Fig. 15, the duct is shown as consisting of a rubber tube or conduit of any other suitable flexible material, while a like result is attained in Fig. 16, by making the tube telescopic,—the buoyant medium $d^2$, in either and all cases maintaining the desired and prescribed relation of the mouth $d^3$, of the duct $d$, with relation to the liquid level in the receptacle $C'$.

What I claim as my invention and desire to secure by Letters Patent is,

1. Liquid dispensing apparatus of the character designated, comprising a container, a mixing and discharge chamber connected therewith, a dispensing faucet having a rotatable valve plug formed with a receiving pocket communicating directly with the lower part of the container and adapted also to communicate with said mixing and discharge chamber, an inlet to said mixing and discharge chamber connected with a floatable drain duct, and said floatable drain duct provided with buoyant means for maintaining its inlet port below the liquid level in the container, for the purpose described.

2. Liquid dispensing apparatus of the character designated, comprising a container, a mixing and discharge chamber connected therewith, a dispensing faucet having a rotatable valve plug formed with a receiving pocket communicating directly with the lower part of the container and adapted also to communicate with said mixing and discharge chamber, means for limiting the rotation of said valve plug to one fourth of a rotation in either direction, an inlet to said mixing and discharge chamber connected with a floatable drain duct, and said floatable drain duct provided with buoyant means for maintaining its inlet port below the liquid level in the container, for the purpose described.

3. Liquid dispensing apparatus of the character designated, comprising a container, a mixing and discharge chamber connected therewith, a dispensing faucet having a rotatable conoidal valve plug mounted in a conoidal seat and formed with a receiving pocket communicating directly with the lower part of the container and also adapted to communicate with said mixing and discharge chamber, elastic resilient means for holding said conoidal valve plug to its conoidal seat, means for limiting the rotation of said valve plug to one fourth of a rotation in either direction, an inlet to said mixing and discharge chamber connected with a floatable drain duct, and said floatable drain duct provided with buoyant means for maintaining its inlet port below the liquid level in the container, for the purpose described.

HARRY C. LYONS.

Witnesses:
 DOROTHY MIATT,
 GEO. WM. MIATT.